(12) United States Patent
Gutt et al.

(10) Patent No.: US 8,291,593 B2
(45) Date of Patent: Oct. 23, 2012

(54) METHOD OF MANUFACTURING MULTICOLORED INTERIOR TRIM COMPONENTS

(75) Inventors: Stephan Gutt, München (DE); Oliver Kleint, Geretsried (DE); Roland Unger, Achmühle (DE); Alfred Dittrich, Wolfratsbausen (DE); Stefan Riesinger, Bad Tölz (DE)

(73) Assignee: Boshoku Automotive Europe GmbH (DE)

( * ) Notice: Subject to any disclaimer, the term of this patent is extended or adjusted under 35 U.S.C. 154(b) by 726 days.

(21) Appl. No.: 11/920,585

(22) PCT Filed: May 15, 2006

(86) PCT No.: PCT/EP2006/062311
§ 371 (c)(1),
(2), (4) Date: Aug. 28, 2009

(87) PCT Pub. No.: WO2006/122919
PCT Pub. Date: Nov. 23, 2006

(65) Prior Publication Data
US 2011/0215603 A1    Sep. 8, 2011

(30) Foreign Application Priority Data

May 20, 2005 (DE) .......... 10 2005 023 945

(51) Int. Cl.
*B21D 53/88* (2006.01)
(52) U.S. Cl. ...... 29/897.2; 264/46.8; 264/250; 264/263; 264/275; 264/294; 425/218; 425/508

(58) Field of Classification Search .......... 29/897.2, 29/527.1; 264/46.8, 250, 263, 275, 294; 425/218, 508
See application file for complete search history.

(56) References Cited

U.S. PATENT DOCUMENTS

| | | | |
|---|---|---|---|
| 5,614,285 A | 3/1997 | Gardill | |
| 5,843,365 A * | 12/1998 | Pinson et al. | 264/517 |
| 5,876,826 A * | 3/1999 | Hoffmann et al. | 428/95 |
| 6,318,783 B1 | 11/2001 | Knox | |
| 6,382,350 B1 * | 5/2002 | Jezewski et al. | 181/290 |
| 6,544,449 B1 * | 4/2003 | Gardner | 264/46.5 |
| 6,892,434 B2 * | 5/2005 | Fenton et al. | 29/469 |
| 7,063,183 B2 * | 6/2006 | Allison et al. | 181/290 |
| 7,143,498 B2 * | 12/2006 | Schoemann et al. | 29/527.1 |
| 2001/0000584 A1 | 5/2001 | Spengler | |
| 2005/0023080 A1 * | 2/2005 | Tompson et al. | 181/296 |

FOREIGN PATENT DOCUMENTS

| | | |
|---|---|---|
| DE | 4305847 A1 | 9/1993 |
| DE | 4401903 C1 | 1/1994 |
| DE | 4400388 C2 | 7/1995 |
| DE | 4447645 C2 | 5/1997 |
| DE | 19607781 A1 | 9/1997 |
| DE | 19706712 | 12/1997 |

(Continued)

*Primary Examiner* — Richard Chang
(74) *Attorney, Agent, or Firm* — Clements Bernard PLLC; Gregory N. Clements

(57) ABSTRACT

A process for preparing interior trim components of a motor vehicle from a support having at least two decorative layers, wherein in a first step the decorative layers are heated to a specific temperature range and are e ared b molding, in a second step the decorative layers are trimmed, and in a third step the decorative layers are positioned in mutual orientation and fixed by reduced pressure, and in a fourth step the decorative layers are transferred to a backing mold and molded with component support (1) on the surface opposite.

6 Claims, 3 Drawing Sheets

FOREIGN PATENT DOCUMENTS

| | | |
|---|---|---|
| DE | 19959654 A1 | 6/2001 |
| DE | 10140873 A1 | 8/2001 |
| DE | 10333161 A1 | 7/2003 |
| EP | 0256803 A | 2/1988 |
| EP | 0759352 | 8/1996 |
| EP | 0816051 | 7/1998 |
| EP | 1147875 A | 10/2001 |
| WO | WO90/03256 | 4/1990 |
| WO | WO01/41999 A1 | 6/2001 |
| WO | WO2005/009721 | 2/2005 |

* cited by examiner

METHOD OF MANUFACTURING MULTICOLORED INTERIOR TRIM COMPONENTS

FIELD OF THE INVENTION

The invention relates to a process for the preparation of multicolored interior trim components of motor vehicles having a defined surface profile, and to the thus obtained interior trim components.

BACKGROUND OF THE INVENTION

DE 44 47 645 C2 relates to a process for the preparation of a molded part, especially an interior trim part or the like for motor vehicles, prepared from a non-woven fabric preimpregnated with a thermoplastic resin, in which the non-woven fabric is heated two-dimensionally in a contact heating press beyond the softening temperature of the thermoplastic resin, and predensified, and this non-woven fabric is pressed under a high pressure and at a temperature of from 100 to 130° C. in a hot-press mold, and the pressed molded part is cooled in at least one cooling step, wherein at least a contact pressure is maintained between the cooling mold and the molded part in said at least one cooling step, wherein a film or other decorative material is backed onto the pressed molded part by heating said film or other decorative material and the surface to be backed of the molded part by contact heat and adjoining them under a low pressure, whereupon the pressed molded part provided with said backing film or other decorative material is cooled.

DE 44 00 388 C2 relates to a process for the preparation of a molded part, especially a trim part for a motor vehicle, consisting of at least one support layer and a backing layer, wherein the flat layers are mutually oriented in parallel extension, and the edges are kept at a distance while the edge is separated off, and the layers are pressed together between two press-mold surfaces to become bonded to one another, whereupon the edge opposite to the processed edge of the support layer is contacted with the support layer and attached thereto, characterized in that, immediately after the edge of the support layer is separated off and the two layers are pressed together, the prominent edge of the backing layer is folded around the processed edge and pressed onto the back side of the support layer, while the molded part still contacts the assigned press-mold surface with its front side.

DE 196 07 781 A1 relates to trim parts for automobiles, which are mostly layer materials with a base and a textile decoration. For technological reasons, the latter has consisted of polyester fibers to date. In contrast, for reducing the number of polymers in a particular overall structure, polypropylene fibers are employed. This is enabled by a novel backing method and a special heat control in the process and preliminary backing of the decoration.

DE 199 59 654 A1 describes a process for the preparation of interior trim components of motor vehicles with a defined surface profile, wherein in a first step a material (1) forming the visible surface is positioned in a mold cavity and shaped under the action of pressure and/or temperature to generate the desired surface embossing, in another step a support material (2) based on natural-fiber reinforced polymer materials is shaped into said mold cavity, edge portions of the material (1) not being covered by the support material (2), followed by demolding the interior trim component from the mold cavity upon bending the edge portions of the material.

In DE 43 05 847 A1, an interior trim for a building body and a process for the preparation thereof is described. The trim has a trim base plate including a base material and a first exterior layer material that has been backed onto the base material or bonded thereto in a laminate fashion. The trim base plate is subdivided into a plurality of adjacent surface portions by means of at least one recess. At least one of the surface portions serves as a built-in part. At least one decorative part is adhesively connected with the trim base plate and comprises at least one rigid base plate designed in a shape matching the built-in part, and at least one second exterior layer material that covers the base plate. At its peripheral portion, the decorative part is provided with a flange which is tightly fit into the recess of the trim base plate. The flange embraces the rigid base plate. The above mentioned trim is prepared by a process which comprises the following steps:

(1) placing a base material onto a first mold part of a press mold, wherein the base material is subdivided into a multitude of adjacent surface portions by means of at least one recess, and wherein at least one of the surface portions serves as a built-in part; (2) placing a decorative part onto said second mold part of the press mold, wherein the second mold part is facing the molded part.

DE 103 33 161 A 1 describes interior trim components of motor vehicles having a defined surface profile.

WO 90/03256 relates to a device and process for the preparation of solid products having a defined surface from a fiber-reinforced component support, which are pressed in a one-step process with cycle times of from 40 to 60 s.

WO 01/41999 A1 relates to a method for the preparation of interior trim components of motor vehicles having a defined surface profile, wherein in a first step a material constituting the visible surface is positioned in a mold cavity and molded by the action of pressure and/or temperature while the desired surface impression is simultaneously produced, in a further step a support material based on natural-fiber reinforced polymer materials is inserted in the mold cavity followed by molding, edge portions of material not being covered by support material, followed by demolding the interior trim component from the mold cavity upon bending the edge portions of the material.

All the processes of the prior art have in common that both the building support and the decorative layer are heated to a (high) backing temperature in order to bond the two parts together. Also, the prior art does not allow the use of a plurality of different portions of the decorative layers with a respectively defined surface and/or color profile that are applied to an integral support material.

WO 2005/009721 A1 describes a process for the preparation of interior trim components of motor vehicles having a defined surface profile. The process is realized by preparing the component support on the basis of natural-fiber reinforced polymer materials and adjusting its surface temperature on the surface to be provided with the decorative layer to the desired backing temperature within a range of from 150 to 180° C. in a first step;

the visible side of the decorative layer is heated to the desired graining temperature within a range of from 200 to 220° C., and the backing side of the decorative layer is heated to the desired backing temperature; and subsequently the component support and the decorative layer are pressed in a mold whose upper part has a structure of said defined surface profile.

Especially Japanese automobile manufacturers make use of the possibility of embossing grains onto decorative materials, mostly for instrument panels, but also for door trims. However, these components constantly do not show any high qualities of the grains and fail to meet the requirements demanded by manufacturers of high quality vehicles in this respect.

In order to be successful in the premium segment of motor vehicles with the so-called in-mold graining method and corresponding interior trim components, the process and the thus obtained interior trim components must be designed in such a way that even the finest grain structures in the embossing mold are taken up by the film, and thus an ideal grain formation and thereby an optimum surface on the component are formed.

Meanwhile, with the process published in WO 2005/009721, it has become possible to image even geometrically complex and very finely structured grains (most extreme example: reproductions of true leather grains) and to produce radii of up to 2.5 mm, while radii of only about 5 to 6 mm are possible with classical backing processes.

Therefore, the automobile manufacturers of premium vehicles are much interested in the in-mold graining methods and corresponding interior trim components. Due to the good grain formation and, above all, the narrow (formerly typical of PUR skin processes) radii, the technology is now directly competing with the PUR skin, which is subsequently back-foamed with PUR.

However, the PUR technology currently has an essential advantage: Since the skin can be prepared in two colors due to the nature of the process, wherein color ranges are separated by a very narrow groove and painted in two colors in an in-mold coating process, or sprayed with PUR systems colored in two colors, integral surfaces with, two or more colors can be produced and subsequently connected with a support part.

However, in the in-mold graining process of the prior art, only two components can be prepared separately and subsequently connected in a suitable joining process, for example, by welding or adhesive bonding. However, these joining processes are very cost-intensive, and double materials (and thus added weight) appear in the region of the joining surfaces. In addition, courses of gaps and transitions to the interior door panel must be matched tediously, which can be realized more easily with an integral support.

Accordingly, an object of the present invention was to provide a process for the preparation of corresponding interior trim components of motor vehicles, especially multicolored components.

SUMMARY OF THE INVENTION

In a first embodiment, the above object of the present invention is achieved by a process for the preparation of interior trim components of motor vehicles from a component support 1 and at least two decorative layers 2a, 2b two-dimensionally bonded thereto with a respectively defined surface and/or color profile of the decorative layers 2a, 2b, wherein:

in a first step, the respective visible sides 3a, 3b of the respective decorative layers 2a, 2b are heated to the respectively desired graining temperatures in the range of from 180 to 220° C., especially from 200 to 220° C., the back sides of the decorative layers 2a, 2b are heated to the respective molding temperatures in the range of from 130 to 170° C., and in a respectively grained mold, the respective molded part geometry and simultaneously the corresponding surface graining of decorative layers 2a, 2b are prepared by pressing, blow molding and/or deep drawing;

in a second step, the edges of the respective decorative layers 2a, 2b are trimmed as necessary, especially in the region of the color separation;

in a third step, the respective decorative layers 2a, 2b are positioned in mutual orientation and fixed by reduced pressure; and in a fourth step, the oriented decorative layers 2a, 2b are transferred to a backing mold and backed in a per se known manner with the component support 1 on the surface opposite to the visible sides 3a, 3b.

DETAILED DESCRIPTION OF THE INVENTION

The advantages of the process according to the invention reside in the fact, in particular, that multicolored components characterized by an integral support can be prepared.

For example, by means of the present invention, an integral door trim support can be prepared that has different film colors grained in an in-mold graining process. For example, when different film laminates are used, the foam thickness for the balustrade and bottom part, so that a higher foam thickness and thus better haptic properties can be employed in the balustrade region while savings can be made in the bottom part by a reduced foam thickness. In addition, different grainings that correspond to the designer's wish can be employed for the balustrade and bottom parts without problems arising from process technology.

Figure 1:
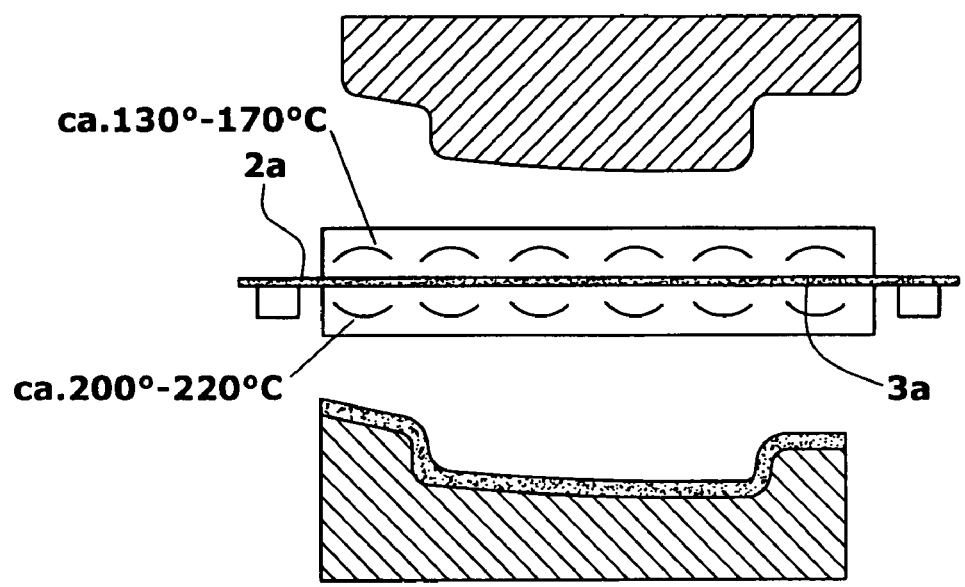
FIG. 1 is a cross-sectional view of the mold and the decorative layered of the present invention.
Figure 2:
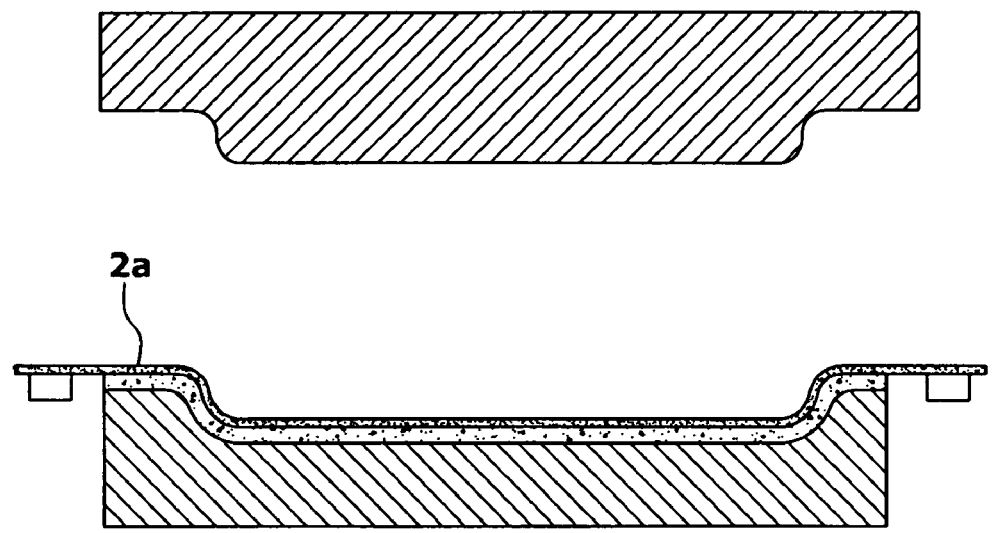
FIG. 2 is a cross-sectional view of the decorative layer molded in the mold.

FIG. 1 shows the preparation of the decorative layer 2a. At first, the decorative layer 2a, which may optionally have a foam layer on the bottom side thereof, is heated to a temperature within a range of from 200 to 220° C. at the upper side and to a temperature within a range of from 130 to 170° C. at the lower side. In the mold consisting of the upper part (punch) and lower part (graining shell), the corresponding molded part geometry of the decorative layer 2a is prepared by pressing and/or deep drawing as shown in FIG. 2. By analogy, this is also done for decorative layer 2b. In the mold consisting of the upper part (punch) and lower part (grained), the corresponding molded part geometry and simultaneously the surface graining of the decorative layer 2a is prepared by pressing and/or deep drawing as shown in FIG. 2. By analogy, this is also done for decorative layer 2b. The grained lower part of the mold is preferably provided with (laser) bores in order that the air can escape from the gap between the decorative layers 2a, 2b and the mold wall. Instead of the film punch, a vacuum method could also be employed, but it is known from former experience that fine grains are imaged with a clearly higher resolution in the punch-press method.

Figure 3:
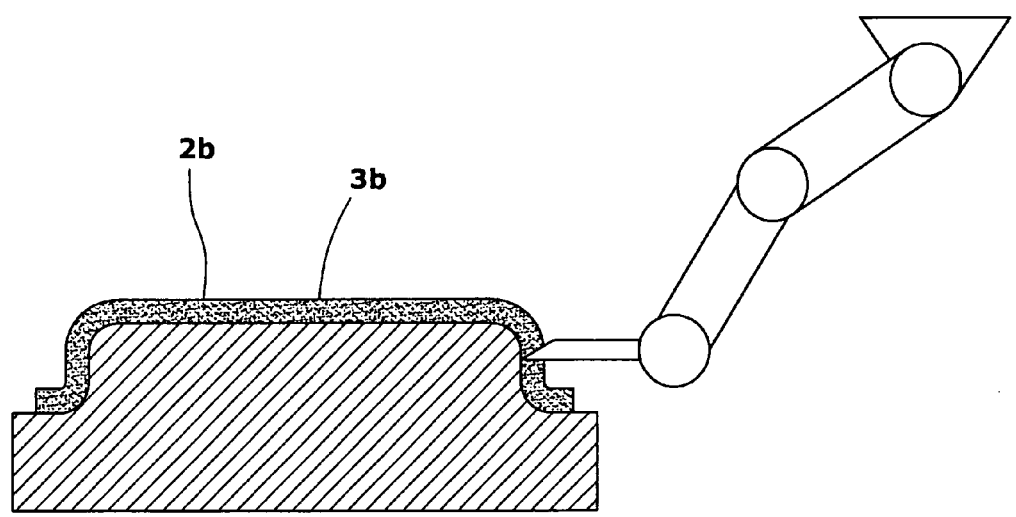
FIG. 3 is a cross-sectional view of the trimming apparatus of the molded part in the mold.

FIG. 3 shows how the grained films produced are trimmed at the edges. This may be performed, for example, by a robot on corresponding cutting receptacles, but it is also possible without difficulty to trim the edges already in the first process step over corresponding tool edges.

Figure 4:
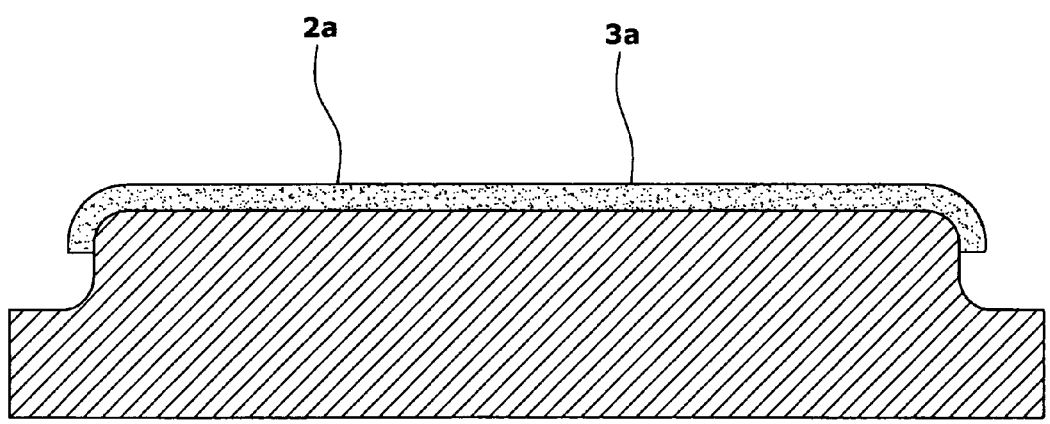
FIG. 4 is a cross-sectional view of the trimmed decorative layer on the mold.

FIG. 4 shows the decorative layer 2a on a lower part of a mold prepared by analogy with FIG. 3.

Figure 5:
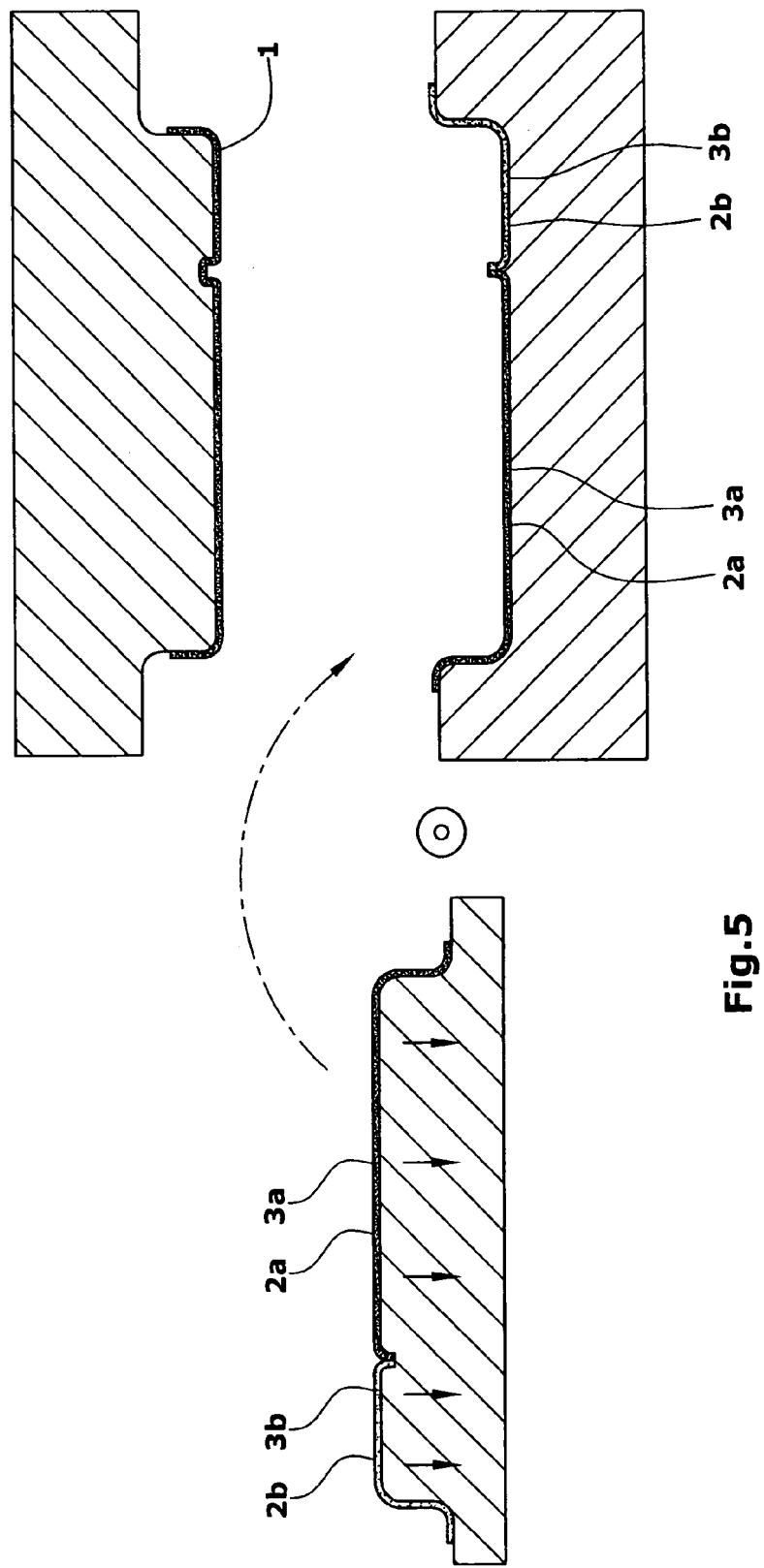
FIG. 5 is a cross-sectional view of two decorative side-by-side-layers of different colors of a vacuum molded process.

FIG. 5 shows how the two decorative layers 2a, 2b are positioned in mutual orientation and fixed on a positive vacuum mold by reduced pressure. The groove through which the color separation runs is oriented in accordance with the component geometry and also fixed under vacuum. Subsequently, the positive receptacle with the films is swiveled by 180° into the actual backing tool (negative) and delivered. Now, when the reduced pressure at the positive receptacle is switched off and, for example, a vacuum is switched on at the lower part of the backing mold, the decorative layers 2a, 2b are fixed here. Now, the component support 1 with decorative layers 2a, 2b can be backed in a per se known manner. Since the back side of the seam between the decorative layers 2a, 2b is exposed before the backing, it is possible to reinforce the back side of this groove in a per se known manner, for example, by clamping, welding or by engaging an additional reinforcement part.

In the press mold, significant excesses of radius can be provided, which enables the definition of very narrow radii in the range of from 0.5 mm, especially from 2 to 3 mm. It is also to be pointed out that due to the low pressure load on the decorative layers 2a, 2b to be backed later, the damage to the foam is substantially lower and foam break and fold problems can be excluded thereby.

At the same time, a graining at this sharp-edged bending radius and the later seam site of the different decorative layers 2a, 2b is also possible. In addition, by means of the present invention, it is possible to realize a dual gloss when a galvano/laser grain is produced, for example, starting from a leathering model.

Another embodiment of the present invention consists in interior trim components of motor vehicles consisting of a component support 1 and at least two decorative layers 2a, 2b two-dimensionally bonded thereto with a respectively defined surface and/or color profile of the decorative layers 2a, 2b.

In a particularly preferred embodiment of the present invention, the interior trim components of motor vehicles according to the invention are characterized in that said component support 1 comprises a door trim support, especially based on natural-fiber reinforced polymer materials, for example, a polypropylene material reinforced by a natural fiber, such as flax, a PUR reinforced by a natural fiber, such as flax, or an epoxy resin material reinforced by a natural fiber, such as flax, as well as a support of PP, ABS or polyamide prepared by an injection molding process. These materials are widely used in automobile construction and are therefore perfectly known to the skilled person.

In another preferred embodiment of the present invention, films, especially foam-backed plastic films, are employed as decorative layers 2a, 2b. This material of the decorative layers 2a, 2b, like the material of the component support 1, is also perfectly known to the person skilled in the art of preparing interior trim components for motor vehicles.

Particularly preferred according to the present invention is a plastic film selected from thermoplastic polyolefin, ASA, polyvinyl chloride or thermoplastic polyurethane. This plastic film preferably contains a foam film, for example, of polyethylene/polypropylene, on the backing side.

The backing temperature of the component support 1 and/or of the side of the decorative layers 2a, 2b opposite to the visible sides 3a, 3b is adjusted to a value within a range of from 150 to 180° C. If the backing temperature is chosen too high, it is to be feared that the foam structure of the back side of the decorative layers 2a, 2b is adversely affected. In contrast, if the backing temperature is chosen too low, a sufficient bonding between the component support 1 and the decorative layers 2a, 2b is not to be expected. Alternatively, an adhesion between the decorative layers and the component support can also be ensured by coating the component support with conventional adhesives (dispersion, solvent, hot-melt adhesives or adhesive films), followed by bonding it to the decorative layers.

In a preferred embodiment according to the invention, decorative layers 2a, 2b are employed having a total surface that protrudes over the support edge of the component support 1 (not shown in the Figures) and is folded over the support edge in a further process step. Alternatively, it is also possible to fold the decorative layers 2a, 2b over the support edge during the backing process.

It is particularly preferred according to the present invention to mutually orient the respective decorative layers 2a, 2b in a positive vacuum mold.

In the fourth step of the process according to the invention, it is particularly preferred that the mutually oriented decorative layers 2a, 2b fixed in the vacuum mold by reduced pressure are swiveled, especially by 180°, and introduced in the backing mold.

According to the present invention, it is further preferred that the reduced pressure is removed from the above mentioned vacuum mold between the third and fourth process steps, and the oriented decorative layers 2a, 2b are fixed in the backing mold by applying reduced pressure to the visible sides 3a, 3b.

The invention claimed is:

1. A process for manufacturing interior trim components of motor vehicles from a component support (1) and at least two decorative layers (2a, 2b) two-dimensionally bonded thereto with a respectively defined visible side and a back side, wherein in a first step, the visible sides (3a, 3b) of the respective decorative layers (2a, 2b) are heated to the desired temperatures in the range of from 180 to 220° C. to provide a graining surface imparted from a grained mold, and the back sides of the decorative layers (2a, 2b) are heated to the molding temperatures in the range of from 130 to 170° C., to provide a molded part and the respective molded part and the corresponding surface graining of decorative layers (2a, 2b) are simultaneously prepared by pressing, blow molding and/or deep drawing;

in a second step, the edges of the respective decorative layers (2a, 2b) are trimmed as necessary;

in a third step, the respective decorative layers (2a, 2b) are positioned in mutual orientation and pressed or molded together by reduced pressure; and in a fourth step, the oriented decorative layers (2a, 2b) are transferred to a backing mold and molded with the component support (1) on the back sides, opposite to the visible sides (3a, 3b).

2. The process according to claim 1, characterized in that decorative layers (2a, 2b) are employed having a total surface that protrudes over the support edge of the component support (1) and is folded over the support edge in a further process step.

3. The process according to claim 1, characterized in that decorative layers (2a, 2b) are employed having a total surface that protrudes over the support edge of the component support (1) and is folded over the support edge of the component support during the backing process.

4. The process according to claim 1, characterized in that the respective decorative layers (2a, 2b) are mutually oriented in a positive vacuum mold in the third step.

5. The process according to claim 1, characterized in that the mutually oriented decorative layers (2*a*, 2*b*) fixed in the vacuum mold by reduced pressure are swiveled and introduced in the backing mold in the fourth step.

6. The process according to claim 5, characterized in that the reduced pressure is removed from the vacuum mold, and the respective decorative layers (2*a*, 2*b*) are fixed in the backing mold by applying reduced pressure to the respective visible sides (3*a*, 3*b*).

* * * * *